United States Patent

[11] 3,553,373

[72] Inventor Walter H. Shaw
253 N.E. 99th St., Miami Shores, Fla. 33153

[21] Appl. No. 605,737
[22] Filed Dec. 29, 1966
[45] Patented Jan. 5, 1971

[54] MANUAL REROUTER SYSTEM FOR TELEPHONE SUBSCRIBER STATION WITH COMBINED CONFERENCE CALL FEATURE
7 Claims, 4 Drawing Figs.

[52] U.S. Cl. ........................................ 179/1, 179/18
[51] Int. Cl. ........................................ H04m 3/58
[50] Field of Search ........................................ 179/1(Conf), 18.02, 42, 18.03

[56] References Cited
UNITED STATES PATENTS

| | | | |
|---|---|---|---|
| 3,264,411 | 8/1966 | Reaves | 179/1(Conf) |
| 3,423,532 | 1/1969 | Coel et al. | 179/1 |

*Primary Examiner*—Kathleen H. Claffy
*Assistant Examiner*—Charles W. Jirauch
*Attorney*—Whittemore, Hulbert and Belknap

ABSTRACT: A subscriber station equipped with two connected desk sets is provided with circuitry which, in response to an incoming call on a line to one set, may hold that line, transmit over the second set of said station the dialing code of a selected reroute station, and complete a coupling link between the incoming and reroute lines for direct communication therebetween. The subscriber station may change the rerouting destination at will, and includes line-hold relay means actuated by plural momentary pushbutton switches. A coil of a relay wired to the first desk set is in series with a winding of an equal impedance transformer coupling the two sets to provide a holding circuit for the coupling.

INVENTOR.
WALTER H. SHAW
BY Whittemore, Hulbert & Belknap
ATTORNEYS

INVENTOR.
WALTER H. SHAW
BY [signature]
ATTORNEYS

MANUAL REROUTER SYSTEM FOR TELEPHONE SUBSCRIBER STATION WITH COMBINED CONFERENCE CALL FEATURE

The present invention relates generally to communication systems, and more particularly, in one aspect, to improved telephone circuitry for establishing bilateral conference or rerouted communication between plural telephone subscriber lines.

Such connections have heretofore required delicate and complex arrangements for properly adjusting signal levels and for avoiding a feedback of unwanted energy to circulate between connected subscriber lines. In order to insure adequate transmission signal amplitudes between such subscriber lines and to compensate for line losses between subscriber stations, it has also been necessary to employ amplifiers for voice signal reproduction. Hence networks must be utilized to dissipate excessive or misdirected energy resulting from such amplification. These complications have to date made bilateral communication between plural telephone lines complex and expensive in terms of unnecessary power requirement and multiplied equipment.

It is therefore a general object of the invention to provide a simple means of connection for plural telephone subscribers, which means functions in a simple manner without requiring amplification of voice signals, thus eliminating the need for and cost of amplifiers required for conference connections between plural subscribers; which acts to eliminate the need for employment of special circuit components in effecting a conference connection; and which makes it possible to eliminate, in a connection of plural subscriber lines, the necessity for making delicate circuit adjustments.

It is a further object of the invention to set up a multiplicity of subscriber lines, as for a conference connection, wherein the transmission conditions are substantially identical to those when only two subscriber lines are connected. Moreover, loss of energy between the associated circuits, and in the addition of other associated subscriber circuits to the existing circuit, is avoided; and the transmission speech energy for normal use will not be affected. Thus, from the standpoint of a central switching system the transmission characteristics and power requirements for conference connections mad through the improved circuitry of the invention are substantially identical to those of normal connections set up by the central switching system.

More particularly, in one illustrative embodiment of my invention shown herein, a single coupling network is provided for association with two or more subscriber lines. This network comprises equal impedance transformer coupling windings, acting to provide uniformity of transmission signals in the voice frequency range to a selected one of the two or more connected subscriber lines. The characteristic of the coupling network is such that the signal circuits are isolated electrically from each other. In other specific embodiments of the invention the transmission paths between a pairs of coupling networks may be constructed in accordance with known techniques, without resorting to the use of hybrid coupling networks and amplifiers having mismatched input and output characteristics.

Thus, in accordance with the present invention a subscriber station or desk set is provided with equipment which, in response to an incoming call on one of the lines to that station, holds that line, transmits over another line of said station the dialing code of a preselected rerout station and completes, at the subscriber station, a coupling link between the incoming and rerout lines for communication between the station of origin of the call and the preselected station. Thus the subscriber has complete control in the rerouting of calls directed to his station and may change the rerouting destination to suit his need or desire by merely notifying the personnel at his station.

More specifically, the rerouting equipment at the subscriber station may include line-hold relay means actuated by plural momentary pushbutton switches to hold the incoming call, and to dial a preselected rerout or remote station for manual transfer of the call thereto.

Further in specific accordance with the invention, a coil of the relay means referred to is in series with a winding of an equal impedance coupling transformer, also mentioned previously, thus providing a holding circuit for the relay means and the circuit through the coupling.

The foregoing, as well as other objects, will become more apparent as this description proceeds, especially when considered in connection with the accompanying drawings illustrating the invention, wherein.

Figure 1:
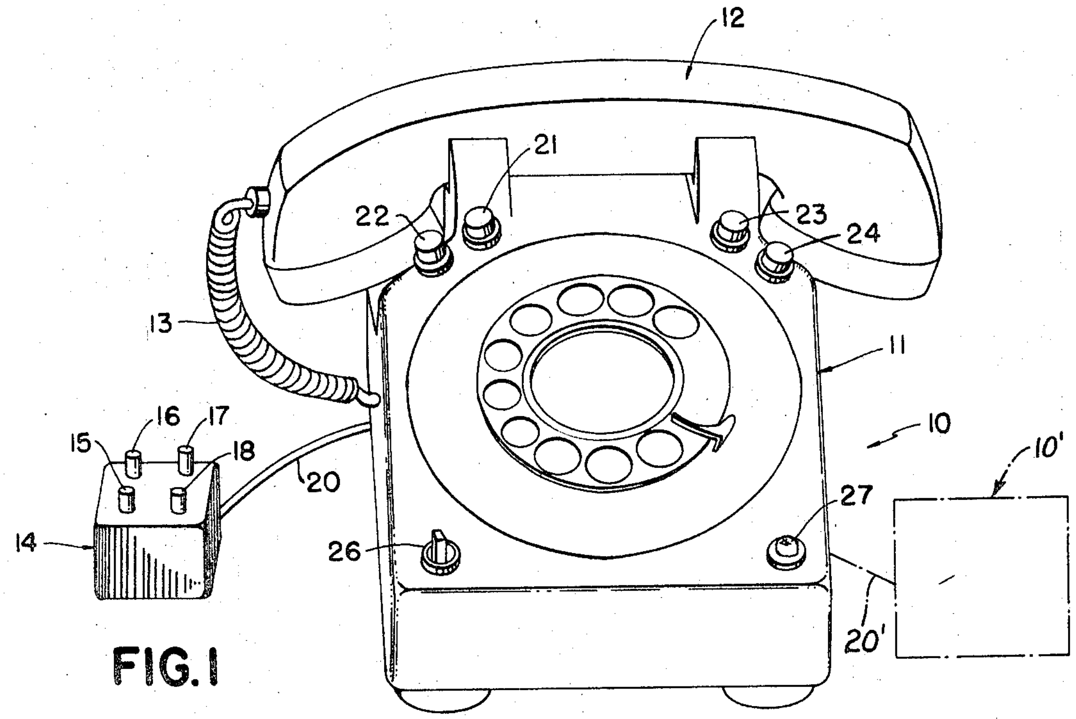
FIG. 1 is a perspective view illustrating the dial and handset assembly of the intermediate station or first telephone line of the improved system, including a conventional four terminal type connector block, it being understood that the intermediate station is also equipped with a second or outgoing assembly or line of like nature and a similar connected set being indicated in dot-dash line.

Referring to FIG. 1, the reference numeral 10 generally designates a conventional telephone desk set constituting one set of an intermediate station in the operation of the improved system, the other set being schematically shown and designated 10'. It includes the usual dial assembly 11 and handset assembly 12 connected by a conducting cord 13 to assembly 11; and a four-terminal connecting block 14 having terminal studs 15, 16, 17 and 18 is conventionally connected to components of the dial and handset assemblies 11 and 12 of set 10 through another conducting cord 20. This is a set incorporating an entirely conventional Model 575 system of Kellogg Telecommunications Division of International Telephone and Telegraph Corporation; and it will be briefly discussed with reference to FIGS. 3 and 4. Other models of the 575 system may have a different type connecting block, and may slightly differ otherwise from the circuitry of FIGS. 3 and 4, but this has no bearing on the invention.

As indicated above, the system of the invention embodies two like telephone sets or lines, i.e., a first one 10 receiving incoming calls and the second one 10' placing outgoing transfer or rerout and conference calls. For the purpose of identification, the tip and ring terminals or contacts of the first line are designated L1T and L1R, respectively, in FIG. 2, while those of the second line are designated $TL_2$ and $RL_2$, respectively. Connections are made by manual dialing at the dial and hand assemblies of the respective telephone sets or units 10; however, a system in which the rerouting is made automatically is the subject matter of my copending application, Ser. No. 782,636, filed Dec. 10, 1968.

As will be also further described in connection with FIG. 2, the set 10 is provided with a first, normally closed, spring return-type pushbutton release switch 21; a first pushbutton hold switch 22, which is a normally open one; a second spring return-type, normally closed pushbutton release or transfer switch 23, and a second, normally open pushbutton hold switch 24. All of the switches are of the momentary contact type.

The dial assembly 11 of set 10 also has a two-line pickup button 26, which may be turned to one or another position to establish communication of an incoming line through the intermediate station or set 10 with one of two or more lines with which a rerouted or a conference connection may be desired. Dial assembly 11 may also be equipped with an optional light 27 which is illuminated by the control party, the person originating the conference transfer call, restoring his handset to the cradle on the phone as a means to flash a visual supervisory signal that both other parties are conversing. The supervisory light will be terminated upon the called party fully restoring his handset to the cradle, giving a complete disconnect signal. This light may be flashed by either the incoming or the selected remote out party to get the attention of the intermediate station 10.

It is to be understood that there will be 10' handset (not shown) at the arm of the operator of intermediate unit 10, through which set the incoming call may be dialed to the selected rerout or conference party. A conducting cord 20' connects the sets 10 and 10'.

Figure 2:
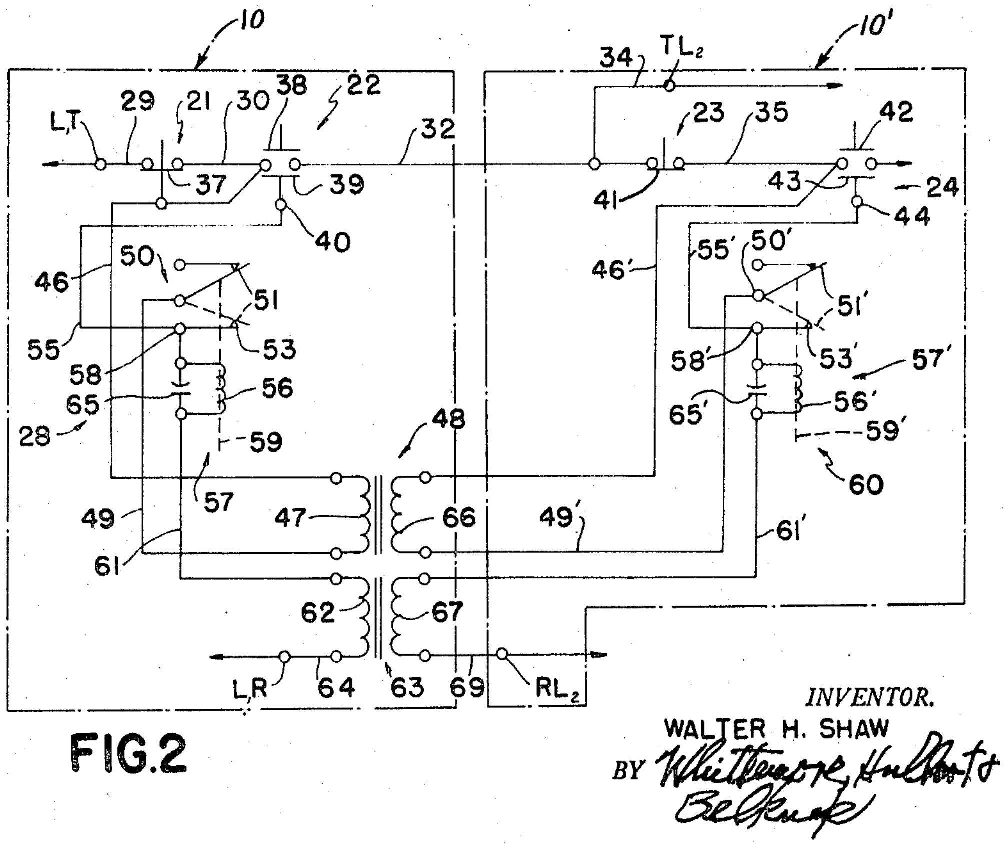
FIG. 2 is a schematic wiring diagram of the rerout or transfer and conference call improvement of the invention.

Now referring to FIG. 2, the improved rerouter and conference circuit of the invention, generally designated by the reference numeral 28, has a terminal of the first, normally closed release switch 21 thereof connected through a lead 29 from the incoming station to the tip terminal L1T of the first intermediate telephone unit or set 10. The other terminal of release switch 21 is connected by a lead 30 to a contact of the first hold switch 22, the second contact of which is connected by leads 32 and 34 with tip terminal $TL_2$ of the second intermediate telephone line or unit of set 10' and with a terminal of the second, normally closed release or transfer switch 23. A further lead 35 connects the other terminal of switch 23 with a pole of second, normally open hold switch 24 of the second line.

First release switch 21 includes a contactor 37 normally urged by spring means (not shown) to bridge its poles; first hold switch 22 includes contactors 38 and 39 adapted to bridge the switch contacts; and the contact 39 is connected to a terminal 40 for the purpose of setting up balanced coupling circuitry between the intermediate sets 10 and 10', as hereinafter described. Second release or transfer switch 23 has a contactor 41 normally spring-urged to bridge its poles and second hold switch 24 has electrically connected contactors 42 and 43, the latter wired to a terminal 44; and the functions of the contactors 41, 42 and 43 correspond, for the second telephone line, to those of the contactors 37, 38 and 39 of first hold switch 22.

One of the poles of first hold switch 22 and the contactor 37 of first release switch 21 are connected through a lead 46 to a terminal of a winding 47 of a first balanced coupling transformer 48; and the opposite terminal of this winding is wired through a lead 49 with the center terminal of a single pole double throw switch 50, whose contactor 51 is adapted to swing and engage a contact 53.

The contactor 39 of the first, normally open hold switch 22, as wired to the terminal 40, is electrically connected by a lead 55 with the contact 53, and the coil winding 56 of a first switch operating and holding relay 57 is also electrically connected with contact 53 at a common terminal 58.

The armature 59 of relay 57 is connected to the contactor 51 of switch 50; so that as the coil 56 of the relay is energized through lead 55 and terminal 58, armature 59 and contactor 51 are driven from the solid line position of FIG. 2 to the dotted line position. This completes a holding circuit through relay 57, and also, through a lead 61, to a winding 62 of a second balanced coupling transformer 63. The circuit of the latter is completed through a lead 64 to the ring terminal L1R of first telephone line or set 10. A filtering capacitor 65 is placed in lead 61 in shunt relationship to the coil 56 of first relay 57.

The respective coupling transformers 48 and 63 have second coil winding 66 and 67, respectively, which are electrically connected with the circuitry of the second telephone unit 10', which circuitry, as generally designated by the reference numeral 60 in FIG. 2, may be considered to be subcircuitry of the basic circuit 28 of that FIG. The output terminal of coil winding 67 of coupling transformer 63 is connected by a lead 69 to ring terminal $RL_2$ of the second telephone unit, just as the lead 34 connects to the tip terminal $TL_2$ of the latter.

Otherwise, the components and wiring connections of the subcircuit 60 are identical to those described above in reference to the first intermediate set; accordingly, corresponding reference numerals, primed, are employed to designate corresponding features, and further description is dispensed with. It may be noted that the contactor 41 of release or transfer switch 23 is not connected to the lead 46', as in the first instance, but such connection will be made, and other coupling provisions duplicated when it is desired to operate more than one selected output line in the system. Lead 32 and the transformer secondary output constitute the conducting cord 20' connecting the telephone sets 10 and 10'.

Figures 3, 4:
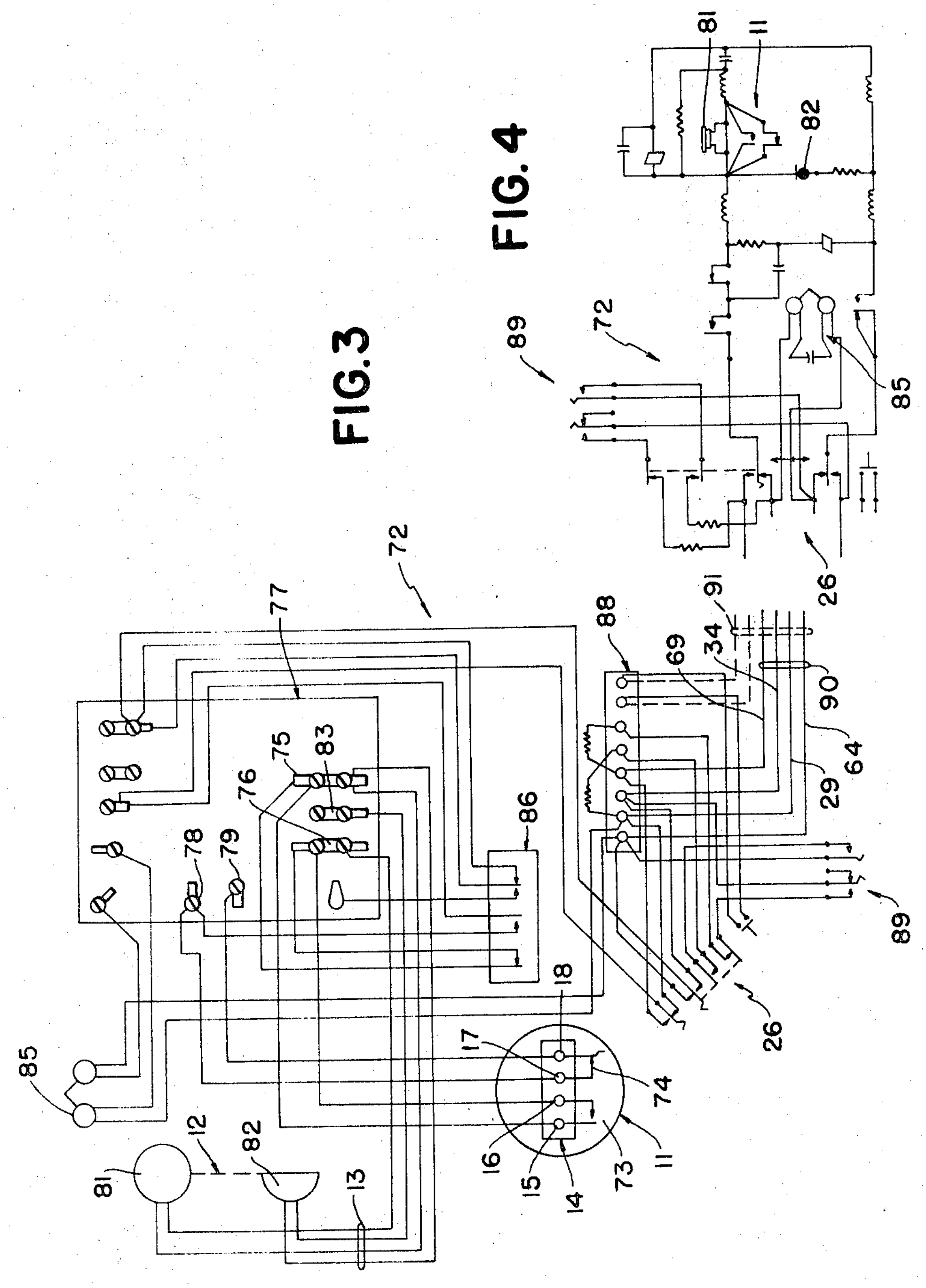
FIG. 3 is an actual wiring diagram of a conventional desk telephone installation, into which the improvement of the invention is connected.
FIG. 4 is a more simple schematic diagram of the circuit detailed in FIG. 3.

Extended description of the Model 575 telephone circuitry which is illustrated in detail and schematically in FIGS. 3 and 4, respectively, is not deemed necessary, Generally considered, the circuit, as designated by the reference numeral 72 in FIGS. 3 and 4, comprises the dial assembly 11 and connector block 14, the terminals 15, 16, 17 and 18 of the latter being connected to a normally open, off normal switch 73 and a normally closed pulse switch 74. Terminals 15, 16 in turn connect to conductive terminal strips 75, 76 of a network generally designated 77. Terminals 17 and 18 of connector block 14 are wired respectively to other terminal posts 78 and 79 of that network.

The handset 12 has its receiver and transmitter units 81, 82, respectively, connected through the cord 13 to the conducting terminal strips 75, 76 of network 77, and to a further similar terminal strip 83 of the network. The telephone ringer is designated 85.

A conventional switchboard of circuit 72 is designated 86, and a terminal board, to which the two line pickup turn and push key 26 is wired, is generally designated 88. A lift-to-hold switch 89 is also wired to board 88; and the latter has leads passing through either a four-lead mounting cord 90 (or an optional six-lead cord 91 in another model).

FIG. 3 shows the manner in which the leads 29, 34, 64 and 69 are brought out in mounting cord 90 to the tip and ring terminals L1T, $TL_2$, L1R and $RL_2$, respectively.

In the use of the improved rerouting or transfer and conference call system 28 of the invention, as depicted in FIG. 2, if it is desired to transfer an incoming call to desk set 10' through the second unit 10 of the intermediate installation to another remote station or set, the user or operator depresses hold switch 22 to a momentary holding position. This energizes the coil of relay 57, its armature 59 drawing the contactor 51 of switch 50 into engagement with the contact 53. This bridges the telephone tip and ring lines 29, 64, through a circuit including lead 55, terminal 58, relay winding or coil 56, lead 61, balanced coupling transformer coil 62 and line 64 to ring terminal L1R of the first line. The circuit also represents a holding circuit for relay 56 . A coupling input circuit also exists through first line tip terminal L1T, lead 29, the contactor 37 of first release switch 21, lead 46, winding 47 of balanced coupling transformer 48, lead 49 and switch 50.

The operator now turns to the second intermediate telephone set 10' and dials the desired number to which the incoming call is to be rerouted or transferred, then depresses the second hold switch 24. This establishes connections through the subcircuit 68 identical to those described above, completing a talking path between the incoming line and the first and second intermediate telephone sets. At this time a three-way conference may be had, or the operator of the first unit 10, having transferred the call, may cradle its hand set 12. At any time, the party on either the transferred line or the incoming line may hang up and the intermediate party may then resume conversation with the originating or incoming line, or may dial still another party through the outgoing line. Release switches 21 and 23 are standard and may be operated in the usual manner.

An advantage of the circuitry is that it is an entirely solid state one, inexpensive as to its components and inexpensively assembled and wired to the standard Model 575 circuitry of FIGS. 3 and 4. The improved circuit 28 may be incorporated in the style of instrument 10 shown in FIG. 1, or it may be housed in a suitable casing having plug and jack means to connect to the standard telephone circuit.

The invention provides a manual rerouting system having relatively simple components and wiring connections; and, as wired for voice connection between two or more subscriber lines through transformer coupling windings 47, 66 and 62, 67 or equal impedance, assures transmission signals of uniformity in the voice frequency range between the interconnected subscriber lines, and with the interconnected circuits isolated electrically from one another. Transmission conditions are substantially the same as when only two subscriber lines are directly connected to one another; and there is no loss of signal energy as between the associated incoming, intermittent and outgoing circuits, even if additional subscriber circuits are added to the circuitry of FIG. 2.

Moreover, since each associated telephone line has its own transformer winding and is independently locked into associated circuitry means to automatically control a disconnect circuit upon the connecting party restoring their handset to normal, the intermediate arranger does not have to monitor or be in on the conference call. A telephone call may be diverted to another location in or out of a given building; and by reason of the utilization of separate transformer windings, individual to each line, the conference call connections are limited only by the number of telephone lines connected at the telephone instrument. Also, by reason of the use of separate transformer windings per line the transmission level remains equal with each connected party.

I claim:

1. A manual call transfer apparatus or system for use in association with a communication network, such as a telephone exchange network, said transfer system being incorporated in an intermediate station having at least two lines connected to said communication network and comprising manual code transmitting means operatively connected to one of said lines and operable to transmit through said network to a selected remote station, normally disconnected coupling means between said lines, including inductive coupling units individual to one each of said lines, but not common to that one and a second of said lines, and means operable in the event of an incoming signal from another station on the other of said lines for holding said signal, for conditioning said code transmitting means to produce on said one of said lines the code of said selected remote station, and for operatively connecting said lines of said intermediate station through one or the other of said respective individual coupling units, thus to complete a communication link from said incoming signal station through the intermediate station to the selected remote station.

2. The transfer apparatus or system of claim 1, in which said manual signal transmitting means comprises at least two manually operated telephone-type units at said intermediate station, each having tip and ring terminals adapted to be connected through a telephone exchange network to said incoming signal and remote stations, said coupling unit comprising balanced transformer coils of substantially equal impedance operatively connecting said telephone units to one another.

3. The transfer apparatus or system of claim 2, and further comprising means to operatively connect to still another remote station the telephone unit normally transmitting to said first named remote station.

4. The transfer apparatus or system of claim 1, in which said coupling means includes a manually actuable switch, and a relay in series with said coupling means and completing a holding circuit through the latter and the relay upon actuation of said switch.

5. The transfer apparatus or system of claim 4, and further comprising means to operatively connect to still another remote station the telephone unit normally transmitting to said first named remote station.

6. A call transfer system for use in association with a communication network, such as a telephone exchange network, said transfer system being incorporated in an intermediate station having at least two lines connected to said communication network and comprising code transmitting means operatively connected to one of said lines and operable to transmit through said network to a selected remote station, normally disconnected coupling means between said lines, including inductive coupling units individual to one each of said lines, but not common to that one and a second of said lines, and means operable in the event a an incoming signal from another station on the other of said lines for holding said signal, for conditioning said code transmitting means to produce on said one of said lines the code of said selected remote station, and for operatively connecting said lines of said intermediate station through one or the other of said respective individual coupling units, thus to complete a communication link from said incoming signal station through the intermediate station to the selected remote station.

7. The transfer system of claim 6, in which said coupling units comprise balanced transformer coils of substantially equal impedance operatively connecting said lines to one another.

PO-1050
(5/69)

UNITED STATES PATENT OFFICE
CERTIFICATE OF CORRECTION

Patent No. 3,553,373 Dated January 5, 1971

Inventor(s) Walter H. Shaw

It is certified that error appears in the above-identified patent and that said Letters Patent are hereby corrected as shown below:

Col. 1, line 54, for "between a pairs of" read -- between pairs of --.

*Col.2, line 64 for "with one of two" read -- with a selected one of two--.

*Col. 3, lines 1 and 2 for "will be 10' handset (not shown) at the arm" read -- will be the other dial and handset 10' at the arm --.

Col. 3, line 62, for "Fig." read -- figure --.

*Col. 4, line 1, for "secondary output constitute the" read -- secondary output lines constitute the --.

Col. 4, lines 32 and 33 for "desk set 10' through the second unit 10 of" read -- desk set 10 through the second unit 10' of --.

Col. 4, line 74, for "or equal impedance" read -- of equal impedance --.

*Col. 6, line 3, for "coupling unit" read -- coupling units--.

Signed and sealed this 22nd day of June 1971.

(SEAL)
Attest:

EDWARD M.FLETCHER,JR.
Attesting Officer

WILLIAM E. SCHUYLER,JR.
Commissioner of Patents